US007542888B2

(12) United States Patent
Critz et al.

(10) Patent No.: US 7,542,888 B2
(45) Date of Patent: Jun. 2, 2009

(54) REPORT GENERATOR FOR A MATHEMATICAL COMPUTING ENVIRONMENT

(75) Inventors: David Karl Critz, Boston, MA (US); Loren Dean, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 171 days.

(21) Appl. No.: 11/592,058

(22) Filed: Nov. 2, 2006

(65) Prior Publication Data

US 2007/0150241 A1 Jun. 28, 2007

Related U.S. Application Data

(63) Continuation of application No. 09/517,952, filed on Mar. 3, 2000, now Pat. No. 7,139,686.

(51) Int. Cl.
*G06F 17/10* (2006.01)
(52) U.S. Cl. ............................. 703/2; 703/6; 715/209; 715/226; 715/239
(58) Field of Classification Search .................. 703/2, 703/6; 709/227; 706/45; 705/7, 51, 10; 345/765; 715/739, 168, 209, 239, 255, 200, 715/226; 726/2, 27
See application file for complete search history.

(56) References Cited

U.S. PATENT DOCUMENTS

| 5,835,922 | A | 11/1998 | Shima et al. | |
|---|---|---|---|---|
| 6,101,489 | A | 8/2000 | Lannert et al. | |
| 6,377,993 | B1 | 4/2002 | Brandt et al. | |
| 7,082,422 | B1 * | 7/2006 | Zirngibl et al. | ............... 706/45 |
| 7,133,845 | B1 * | 11/2006 | Ginter et al. | ................. 705/51 |
| 7,225,249 | B1 * | 5/2007 | Barry et al. | ................ 709/227 |
| 7,315,826 | B1 * | 1/2008 | Guheen et al. | ................. 705/7 |

(Continued)

OTHER PUBLICATIONS

Frank, Ulrich, "Enhancing Object-Oriented Modeling with Concepts to Integrate Electronic Documents," *Proceedings of the Thirtieth Hawaii International Conference on System Sciences*, vol. 6:127-136 (1997).

(Continued)

*Primary Examiner*—Paul L Rodriguez
*Assistant Examiner*—Kandasamy Thangavelu
(74) *Attorney, Agent, or Firm*—Lahive & Cockfield, LLP; Kevin J. Canning

(57) ABSTRACT

A method and apparatus, including a computer program apparatus, implementing techniques for generating a report from a technical computing environment provided by a mathematical computer program. A report generator defines a set of reporting components that can be assembled to form a report template and processes the reporting components of the report template in order to extract data from the mathematical computing environment and generate the report. The report generator includes a user interface by which a designer can hierarchically assemble the reporting elements, which are defined according to an object-oriented programming language. The report generator bi-directionally communicates with the mathematical computing environment such that the report generator can evaluate expressions defined within the mathematical computing environment, change initial conditions and parameters of a mathematical model, and issue commands to advance the state of the model. The report generator includes a generation engine that generates an intermediate representation of the report and a transformation engine that transforms the intermediate representation into an electronic document according to a user-selected format.

82 Claims, 11 Drawing Sheets

U.S. PATENT DOCUMENTS

2003/0058277 A1* 3/2003 Bowman-Amuah ......... 345/765

OTHER PUBLICATIONS

Skidmore, Jenifer L. et al., "A Prototype Notebook-Based Environment for Computational Tools," *IEEE/ACM Conference on Supercomputing, SC98*, (1998).

Weitz, Wolfgang, "SGML Nets: Integrating Document and Workflow Modeling," *Proceedings of the Thirty-first Hawaii International Conference on System Sciences*, vol. 2:185-194 (1998).

Young, Robert et al., "A Knowledge-Based Electronic Information and Documentation System," *Proceedings of the 5th International Conference on Intelligent User Interfaces*, pp. 280-285 (2000).

* cited by examiner

Formating Components

| Component | Output / Behavior |
|---|---|
| cfrcelltable | Cell Table |
| cfrsection | Chapter/Subsection |
| cfrimage | Image |
| cfrlink | Link |
| cfrlist | List |
| cfrparagraph | Paragraph |
| cfrtext | Text |
| cfr_titlepage | Title Page |

*Fig. 8A*

Graphic Handling Components

| Component | Output / Behavior |
|---|---|
| chgfigloop | Figure Loop |
| chgfigproptable | Figure Property Table |
| chgfigsnap | Graphics Figure Snapshot |
| chgobjname | Graphics Object Name |
| chgproperty | Handle Graphics Parameter |

*Fig. 8B*

Logical & Flow Control Components

| Component | Output / Behavior |
|---|---|
| cloelse | <if> Else |
| cloelseif | <if> Elseif |
| clothen | <if> Then |
| clofor | For Loop |
| cloif | Logical If |

*Fig. 8C*

Technical Computing Components

| Component | Output / Behavior |
|---|---|
| cmleval | Evaluate an Expression |
| cmlvariable | Insert Variable |
| cml_ver | MATLAB/Toolbox Version Number |
| cmlwhos | Variable Table |

*Fig. 9A*

Reporting Components

| Component | Output / Behavior |
|---|---|
| crg_comment | Comment |
| crgempty | Empty Component |
| crg_import_file | Import File |
| crgnestset | Nest Setup File |
| crg_halt_gen | Stop Report Generation |
| crgtds | Time/Date Stamp |

*Fig. 9B*

Simulator Components

| Component | Output / Behavior |
|---|---|
| cslsortblocklist | Block Execution Order |
| csl_blk_loop | Block Loop |
| csl_blk_proptable | Block Property Table |
| cslblockcount | Block Type Count |
| csl_mdl_changelog | Model Change Log |
| csl_functions | Model Functions |
| csl_mdl_loop | Model Loop |
| csl_mdl_proptable | Model Property Table |
| cslsim | Model Simulation |
| csl_variables | Model Variables |
| csllinktarget | Object Linking Anchor |
| csllinkname | Object Name |
| cslproperty | Object Property |
| csl_summ_table | Object Summary Table |
| cslscopesnap | Scope Snapshot |
| csl_sig_loop | Signal Loop |
| csl_sig_proptable | Signal Property Table |
| cslfilter | System Filter |
| cslsyslist | System Hierarchy |
| csl_sys_loop | System Loop |
| csl_sys_proptable | System Property Table |
| cslsnapshot | System Snapshot |

*Fig. 10A*

State Control Components

| Component | Output / Behavior |
|---|---|
| csf_hier_loop | Stateflow Loop |
| csf_obj_report | Stateflow Object Report |
| csf_prop_table | Stateflow Property Table |
| csf_snapshot | Stateflow Snapshot |
| crg_halt_gen | Stop Report Generation |

*Fig. 10B*

REPORT GENERATOR FOR A MATHEMATICAL COMPUTING ENVIRONMENT

RELATED APPLICATIONS

This application is a continuation of and claims benefit to U.S. patent application Ser. No. 09/517,952, filed Mar. 3, 2000, the contents of which are hereby incorporated by reference.

TECHNICAL FIELD

The invention relates to a computer program for generating reports from a mathematical computing environment.

BACKGROUND

Conventional mathematical tools, such as such as MATLAB™ from Math Works™, Inc., of Natick, Mass., provide a comprehensive technical computing environment for performing numerical linear algebraic calculations, solving ordinary differential equations, analyzing data, and visualizing solutions to complex mathematical formulas by generating graphs or other images. The computing environment often provides a high-level programming language that includes a variety of operators and programming commands.

Engineers use such mathematical tools for a variety of applications such as designing complex mechanical and electrical control systems, solving optimization problems and performing statistical analysis. Engineers often use these mathematical tools in conjunction with a simulation tool for defining and simulating complex mathematical models. For example, manufacturers of mechanical and electronic systems, e.g., cars and integrated circuits, use simulation tools to help them design their products. These tools allow designers to build and test mathematical models of their systems before building a physical prototype. Commercial simulation models can be extremely complex and may include thousands of interconnected functional blocks. Using a simulation tool, a designer can simulate and observe changes in a model over a period of time, typically represented as a series of discrete instants, called time steps, such as 1 millisecond, 1 second, 2 hours, etc. Starting from a set of initial conditions, specified by the designer, the simulation tool drives the model and determines the state of the model at various time steps.

To examine and present information generated by the technical computing environment and the simulation tool, designers often create several types of reports. Because commercial models are so complex, the designer can create a myriad of reports, each report serving a particular purpose. Typical reports include, for example, a title, the name of the author, a brief text description of the report, a legend, and, of course, the actual data drawn from the model during simulation. Many of these elements are fixed while others vary over time when the simulation data in the model changes.

A designer, therefore, faces many tradeoffs when designing a report including determining the structure of the report, specifying the fixed elements and the varying elements of the report and where they should be positioned. This can be particularly difficult for varying elements because it requires that the designer extract data from the model while the simulation is running. Often, the designer wishes to generate a report for a particular state of the model, or time step associated with the simulation. This can be difficult because simulations often take many hours to complete. In addition, the designer must save the report in a format convenient to run the same report multiple times and that can be easily shared with others. Many conventional simulation programs and modeling tools exist that have limited ability to generate reports. However, most report generator programs provide only a small number of reports, and allow, at most, only certain limited customization such as changing the title of the report and the name of the author.

SUMMARY OF THE INVENTION

In general, the invention provides a method and apparatus, including a computer program apparatus that provides an object-oriented, component-based report programming language by which a designer can easily customize and assemble a report at various levels of hierarchical abstraction.

In one aspect, the invention is directed to a method of generating a report from a technical computing environment provided by a mathematical tool. According to the method, a set of reporting components is defined that can be assembled to form a report template. The reporting components of the report template are processed to perform one or more operations within the computing environment. A report is generated as a function of the processed reporting components.

In another aspect, the invention is directed to a report generator computer program that defines a set of reporting components that can be assembled to form a report template and processes the reporting components of the report template in order to extract data from a model simulator and generate the report. The report generator includes a user interface by which a designer can hierarchically assemble the reporting elements, which are defined according to an object-oriented programming language. The report generator and the technical computing environment bi-directionally communicate such that the report generator is able to evaluate expressions in the technical computing environment, change initial conditions and parameters of the model, and issue commands to the technical computing environment to advance the current state of a simulated model. In one embodiment, the report generator issues commands using an internal programming language of the technical computing environment. The report generator can, therefore, control the simulation in order to produce a report on a state at a particular time step. The report generator includes a generation engine that generates an intermediate representation of the report and a transformation engine that transforms the intermediate representation into an electronic document according to a user-selected format.

The details of various embodiments of the invention are set forth in the accompanying drawings and the description below. Other features and advantages of the invention will become apparent from the description, the drawings, and the claims.

BRIEF DESCRIPTION OF THE DRAWINGS

FIGS. 8A, 8B, 8C, 9A, 9B, 10A and 10B illustrate one embodiment of a suitable set of report components that can be used to define and generate a corresponding report.

DETAILED DESCRIPTION

Figure 1:
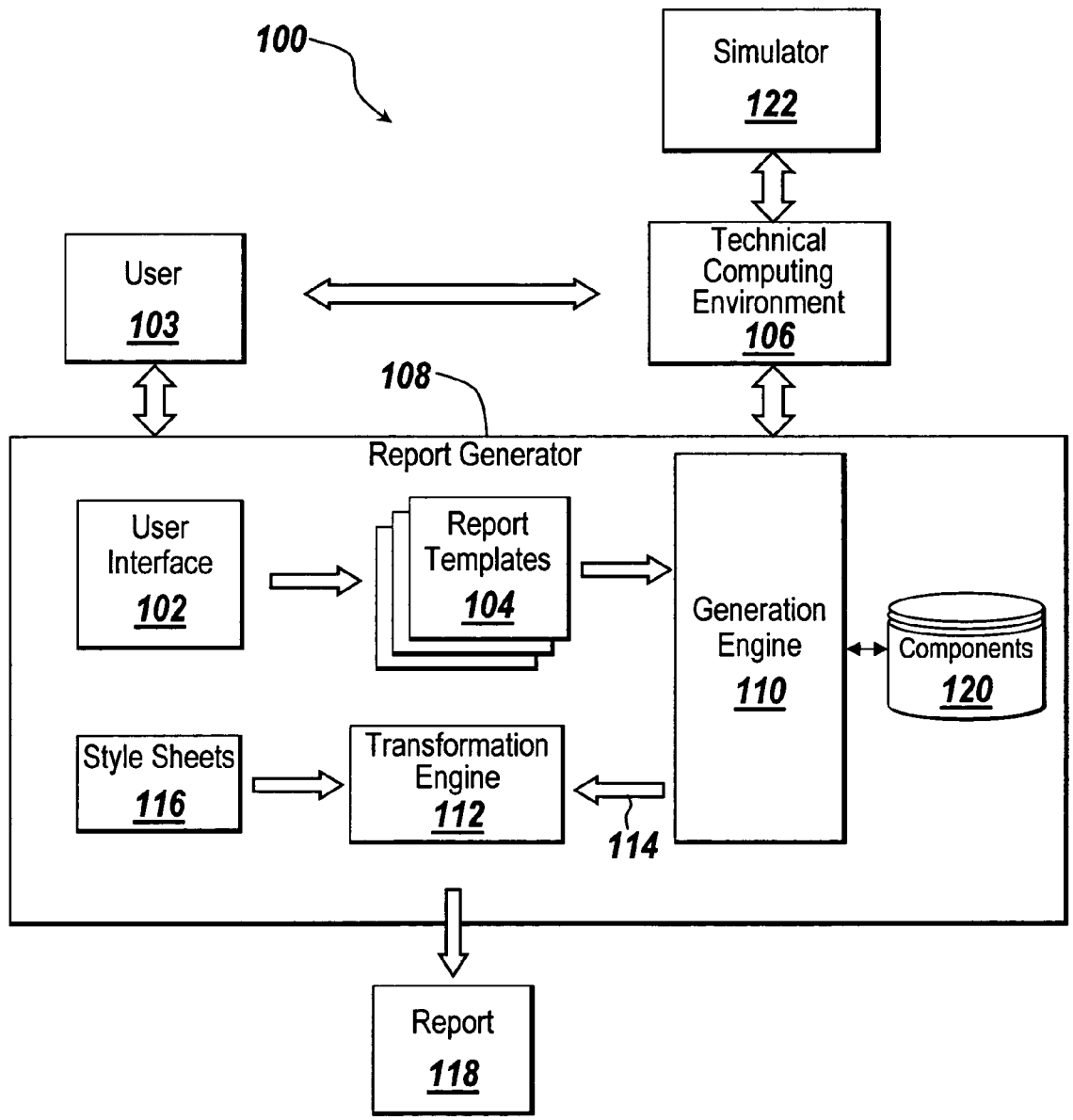
FIG. 1 is a block diagram providing a high-level overview of a report generator that generates a report according to the invention.

FIG. 1 is a block diagram providing a high-level overview of a tool 100 including report generator 108 that interacts with technical computing environment 106 and simulator 122 to generate report 118. Technical computing environment 106 combines numeric computation, mechanisms for importing and exporting data in a variety of formats, graphic. display of data, and a high-level programming language. The high-level programming language provides flow-control constructs and often includes a variety of operators for performing numerical analysis, string manipulation, and even graphical user interface (GUI) design.

User 103 interacts with computing environment 106 to perform a wide variety of numeric computations such as the creation and manipulation of N-dimensional arrays. For example, user 103 can define a square matrix within calculation workspace 106 using a single command. The user 103 can directly manipulate the matrix, using one command to find its inverse, another command to find its transpose, or another command to learn its determinant. Computing environment 106 includes a command interpreter that sequentially executes the commands entered by user 103. A calculation workspace provided by computing environment 106 stores the resultant data as well as component definitions and interconnection data that define the current model.

Simulator 122 interacts with computing environment 106 in order to simulate the model defined within the calculation workspace. Simulator 122 includes various algorithms and processes for advancing the model and stores state information of the model during the simulation.

As described in detail below, report generator 108 defines a set of report components 120, each report component 120 having a defined behavior such as inserting data or other information into report 118. Generation engine 110 creates an environment for components 120 to operate and processes each component according to the component's defined behavior. Based on the execution of the reporting components 120, generation engine 110 makes a variety of decisions such as how to format report 118 and what data to include in report 118.

For example, when processed by generation engine 110, each report component 120 produces a variety of output data such as formatted text, lists, tables, links, and images, or controls the flow of generation engine 110 through the reporting process. The output data can be predefined or can be extracted from computing environment 106. In addition, a component 120 may direct generation engine 110 to import external information. For example, the model may reference external code files to help with more complex calculations. When external code files are available in source form, generation engine 110 can include these files into report 118. Generation engine 110 can also import external text files and images in many other formats. A subset of report components 120 define a reporting programming language having flow control constructs such as for-loops, while-loops and if-then-else statements.

Each report template 104 identifies a corresponding set of report components 120 that, when executed by generation engine 110, generate a corresponding report 118. User 103 interacts with report generator 108 via user interface 102 and creates a report template 104 by selecting and assembling components 120 as a hierarchical tree. The user 103 can modify the resultant report 118 by adding or deleting components 120 from the component hierarchy of the corresponding report template 104. In addition, user 103 can define new report components or modify the properties of existing report components 120. A report template 104 can also refer to other report templates 104. In this manner, output report 118 can combine results from several report templates 104, where the results from a report template 104 can depend on the results from prior report templates 104. In one implementation, a report template 104 can be recursively defined.

When generation engine 110 processes a report template 104, each component 120 acts independently, but its behavior is influenced by ancestor components in the component hierarchy. More specifically, within the hierarchy, each component 120 controls the order and manner in which its child components are executed. In one embodiment, report components 120 are implemented in an object oriented programming language, such as C++, Java, or a proprietary language, and are derived from a common base class.

Report 118 is an electronic document in one of a number of conventional formats such as Hypertext Markup web format (HTML), Microsoft Word interchange format (RTF), a typesetting format such as TeX, and Adobe Frame Maker interchange format (MIF). Generation engine 110 produces an intermediate representation 114 of a given report in an abstract form. Transformation engine 112 processes intermediate representation 110 to produce the report 118 in a user-selected document format.

In one embodiment generation engine 110 produces intermediate representation 114 as either Standard Generalized Markup Language (SGML) or Extensible Markup Language (XML). SGML is a format for organizing and tagging elements of a document. Notably, SGML does not specify any particular formatting; rather, it specifies rules for tagging elements. These tags can then be interpreted to format elements in different ways. XML is derived from SGML and is a markup language especially designed for "web" documents, i.e., documents exchanged over the Internet. Style sheets 116 include rules defining how transformation engine should transform the intermediate representation 114 into report 118.

Figure 2:
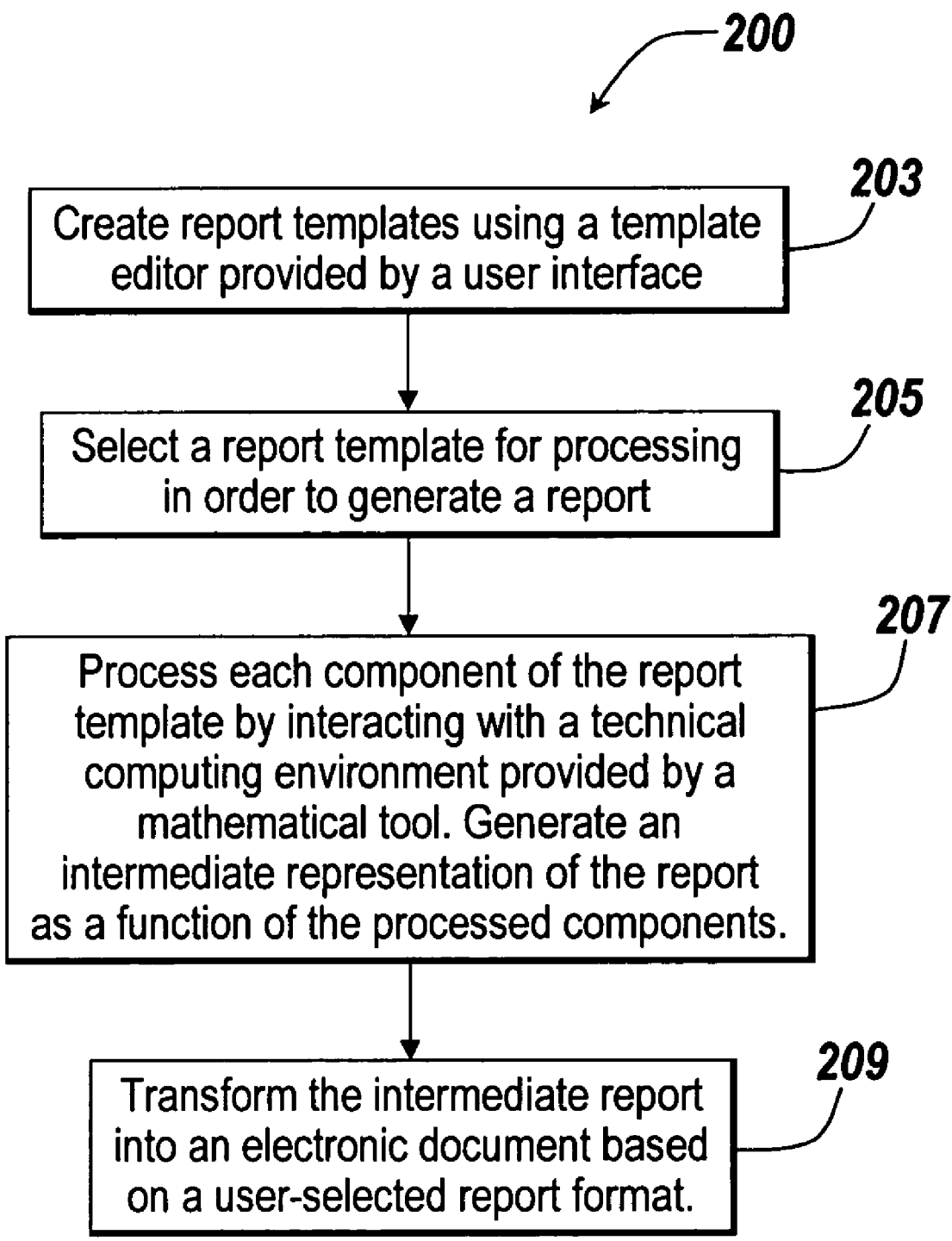
FIG. 2 is a flow chart illustrating one embodiment of a process, suitable for implementation in a computer program, in which the report generator that operates on a set of object-oriented reporting elements to interact with a model simulator in order to generate the report.

FIG. 2 is a flow chart illustrating one embodiment of a process 200, suitable for implementation in a computer program application, in which report generator 108 (FIG. 1) interacts with computing environment 106 and simulator 122 to generate report 118. Report generator 108 presents user interface 102 by which user 103 creates one or more report templates 104 (block 203). User interface 102 provides a graphical editor for creating and editing report templates 104 and a component creation wizard for defining new components for inclusion in a report template 104. Creation of a report template 104, however, is optional and may be skipped if user 103 elects to use a previously defined report template 104. Upon request, user interface 102 provides a list of all of the report templates 104. In order to generate corresponding report 118, user 103 selects one of the report templates 104 and instructs generation engine 110 to process the selected report template 104 to generate report 118 (step 205).

In response, generation engine 110 loads the selected report template 104 and creates an environment for components 120 to operate (block 207). Generation engine 110 bi-directionally communicates with computing environment 106 and issues commands to computing environment 106 using the high-level programming language provided by computing environment 106. Computing environment 106 interprets and executes the commands as if they had been entered directly by user 103. In this manner, reporting components 120 can perform a variety of functions within the computing environment 106 including requesting data from the calculation workspace, evaluating an expression defined within the workspace, requesting data from simulator 122 and requesting data from a graphics package. In addition, reporting components 120 can change the state of the simulation model. For example, a reporting component can simulate the model, increment the model simulation by one or more time steps, change a parameter or initial condition of the model or even change the model itself by adding or removing a functional block. Reporting components 120 can also execute external processes that change the state of the calculation workspace.

While processing each component of the selected report template 104, generation engine 110 produces an intermediate representation 114 of report 118. This is advantageous because intermediate representation 114 is in a generic, abstract form that can be readily converted into a wide variety of document formats (block 207). In one embodiment intermediate representation 114 is formatted according to a generalized markup language such as SGML or XML.

Transformation engine 112 processes intermediate representation 114 to produce the report 118 in a user-selected document format such as Hypertext Markup web format (HTML), Microsoft Word interchange format (RTF), a typesetting language such as TeX, and Adobe Frame Maker interchange format (MIF) (block 209).

Figure 3:
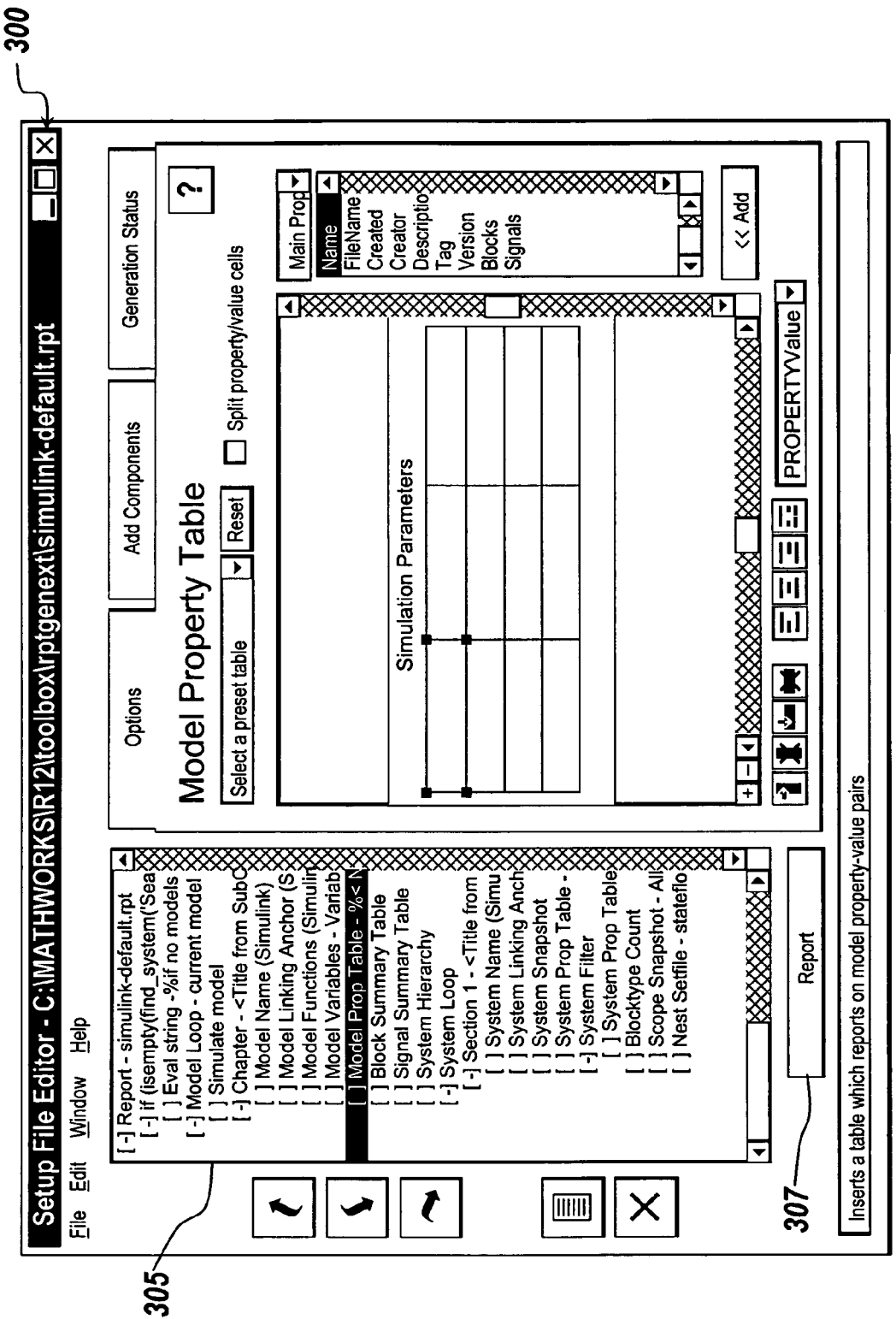
FIG. 3 illustrates one embodiment of a graphical editor displayed by a user interface of the report generator by which a report designer can create and maintain report templates.

FIG. 3 illustrates one embodiment of a graphical editor 300 displayed by user interface 102 by which user 103 can create and maintain report templates 104. Notably, editor 300 presents the hierarchy of components 305 defined by a corresponding report template. Using editor 300, user 103 can rearrange the order of the components 305, modify properties for the components 305, add new components and, by clicking on button 307, generate a report 118 for the report template 104 that is currently being edited.

Figure 4:
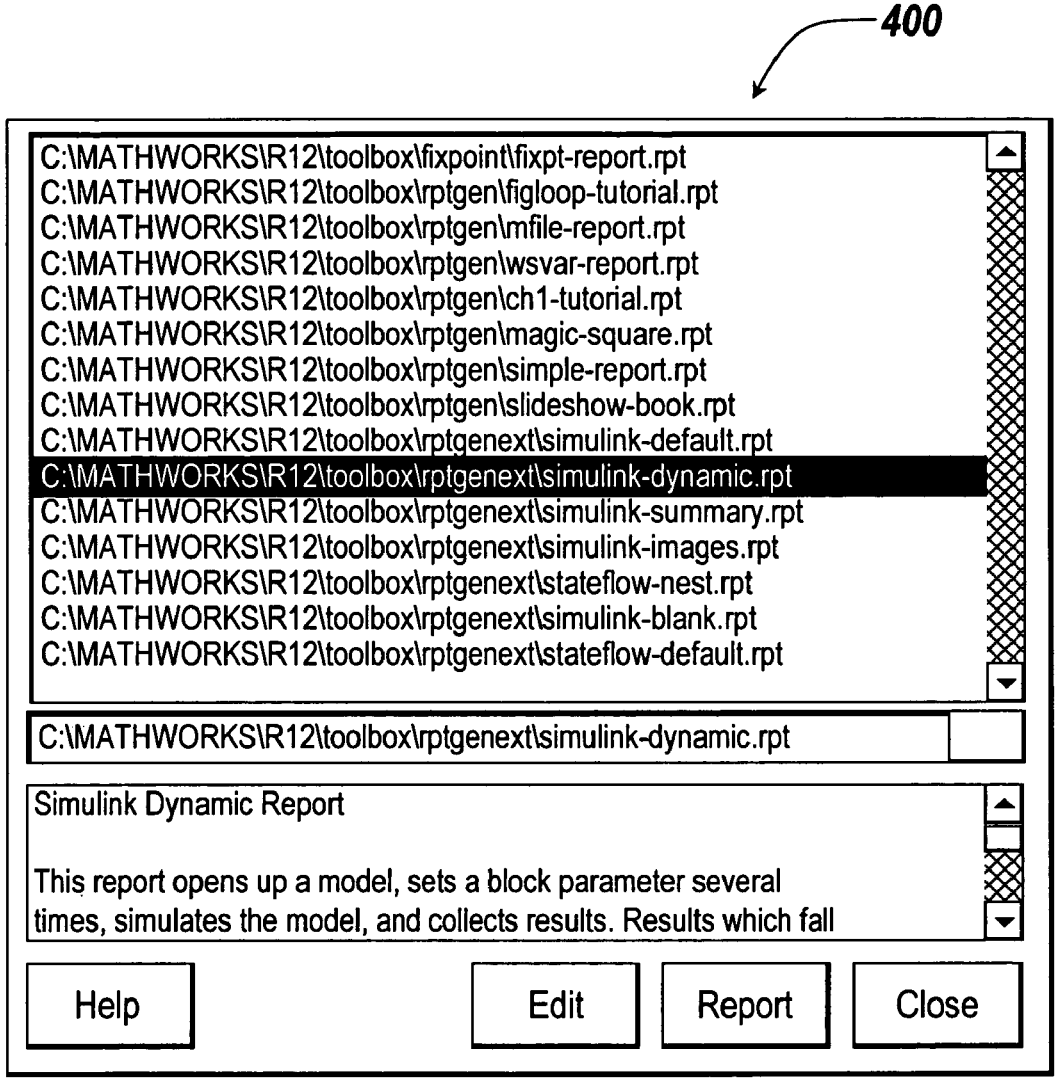
FIG. 4 illustrates one embodiment of a window displayed by the user interface for selecting a report template from a list of report templates for editing or printing.

FIG. 4 illustrates one embodiment of a window 400 displayed by user interface 102 by which user 103 can scroll through a list of report templates 114. Upon selecting a report template 104 from the list, the designer can elect to edit the report template or can instruct generation engine 110 to process the selected report template 104 and generate the corresponding report 118. In one embodiment, user interface 102 can be bypassed such that user 103 can generate reports 118 from a command line interface provided by an operating system.

Figure 5:
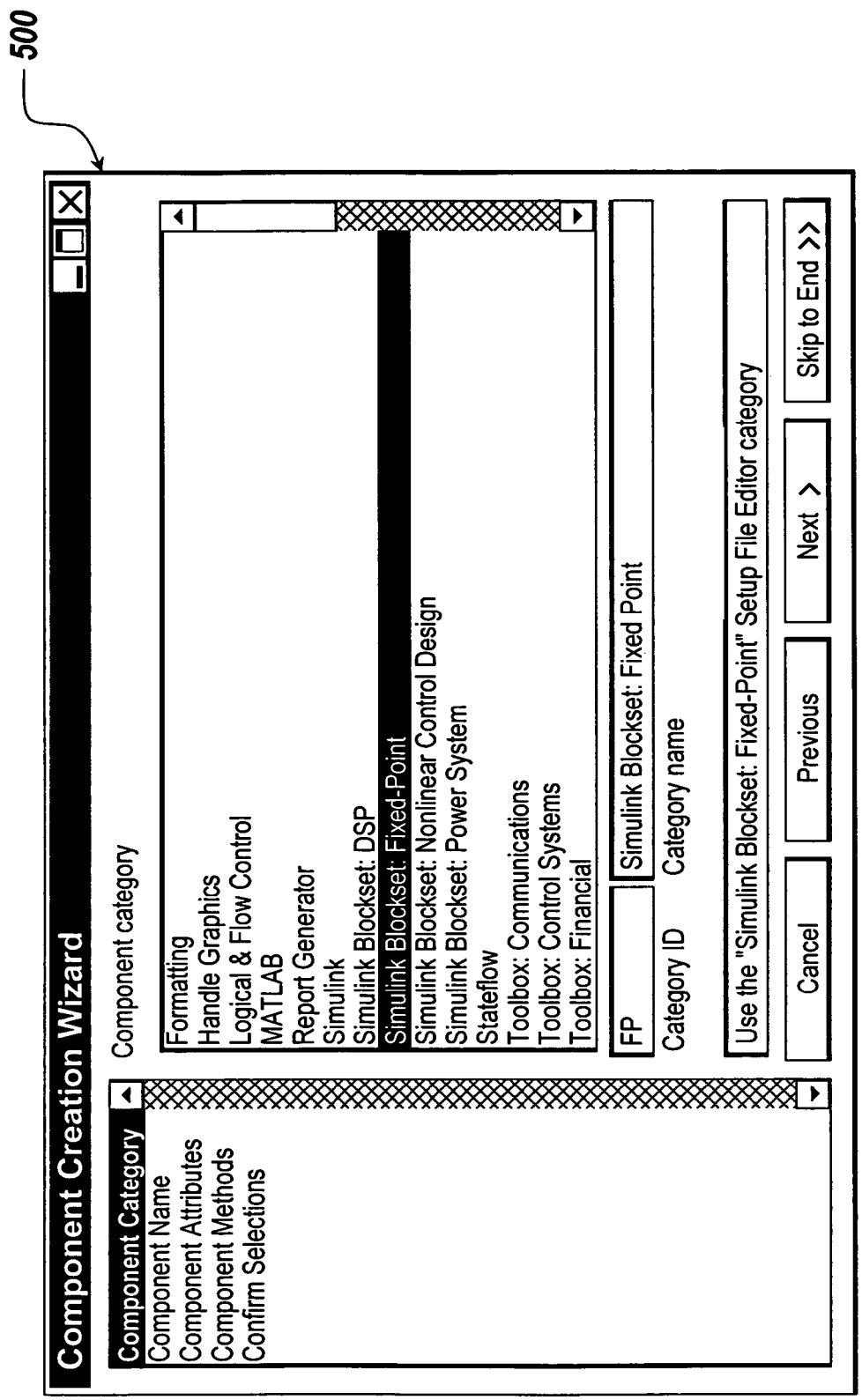
FIG. 5 illustrates one embodiment of a component creation wizard displayed by the user interface for creating and customizing new report components.

FIG. 5 illustrates one embodiment of a component creation wizard 400 displayed by user interface 102 by which user 103 creates and customizes new report components. Using wizard 400, user 103 assigns the new component to a component category and defines various attributes and methods for the component.

Figure 6:
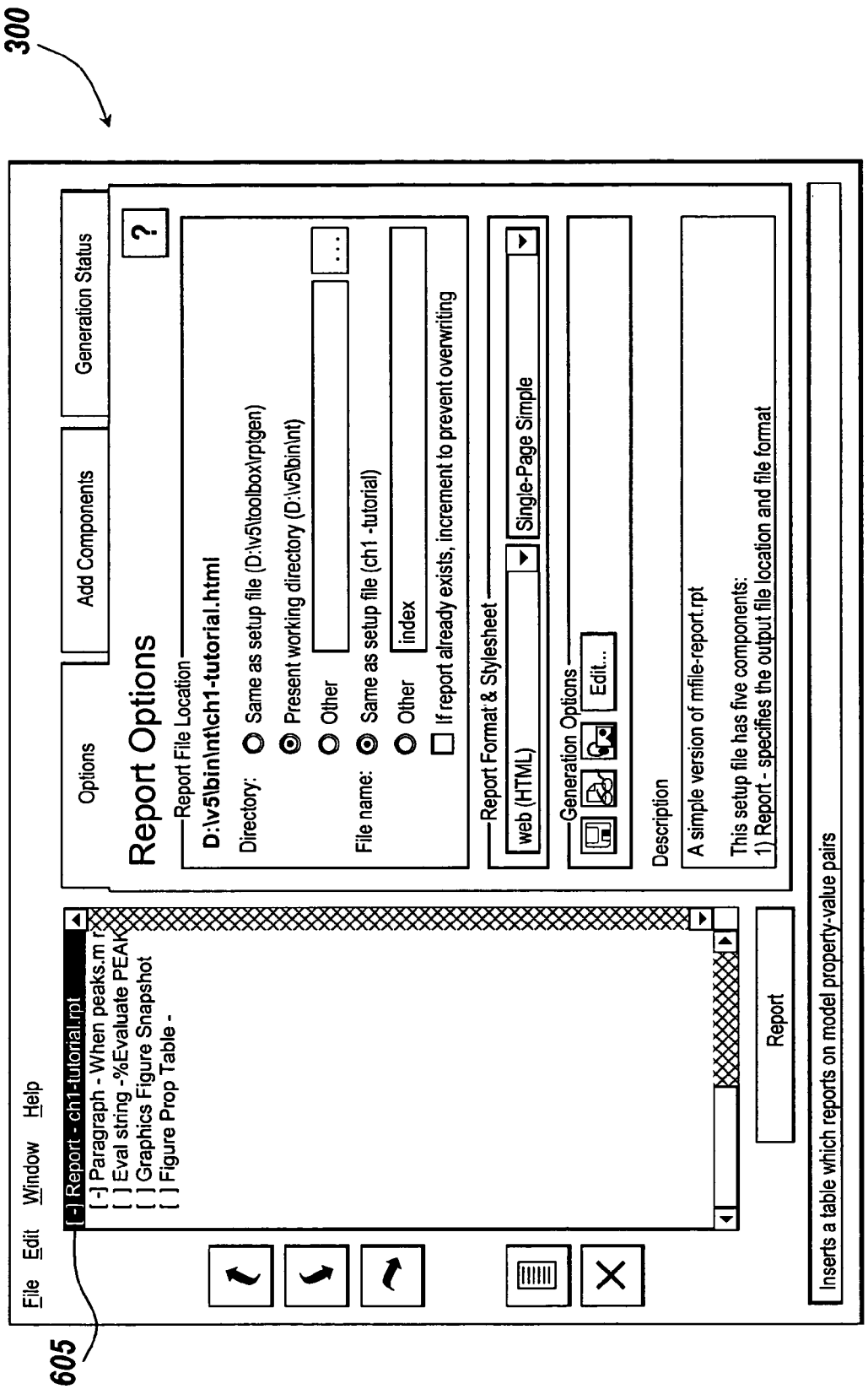
FIG. 6 illustrates the graphical editor listing reporting components for another example report template.
Figure 7:
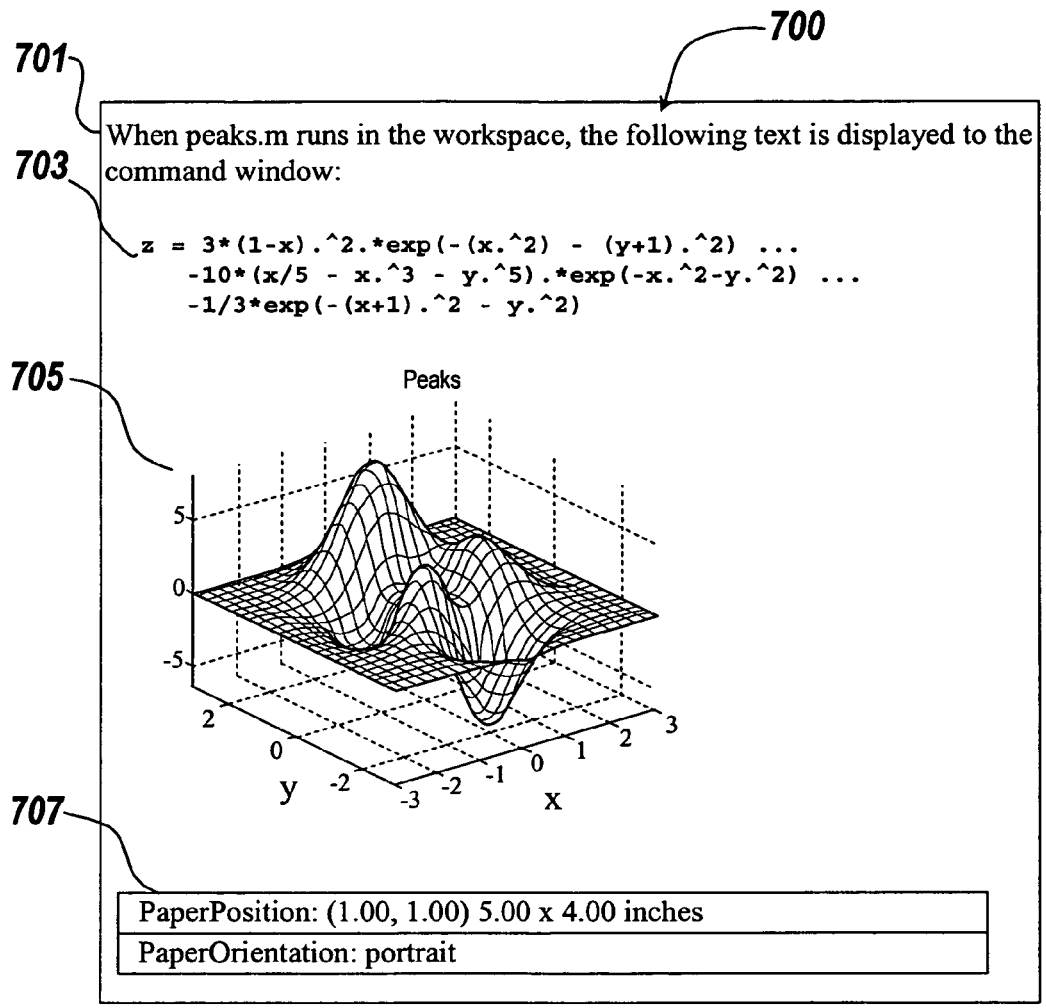
FIG. 7 illustrates a corresponding report produced by the report generator for the example report template illustrated in FIG. 6.

FIG. 6 illustrates graphical editor 300 (FIG. 3) listing components 605 for an example report template 104. In the example report template, the first component of components 605 is a high-level report component that specifies output options, including output file format. The report component does not insert any visible output into report 118. The second component is a paragraph component used to insert formatted text. In the example report, the paragraph component inserts the following paragraph: "When peaks.m runs in the workspace, the following text is displayed to the command window: ". The third component causes generation engine 110 to evaluate an expression defined within the workspace of computing environment 106. The expression, written in the internal programming language of computing environment 106, causes computing environment 106 to output a 3-dimensional graph of an equation. The fourth component of the report template instructs generation engine 110 to capture a screen snapshot of the generated figure and insert the snapshot into report 118. The last component of the report template inserts a table of selected that presents various properties for the captured image. FIG. 7 illustrates a sample report 700 produced by report generator 108 and illustrates the corresponding output of these report components including formatted paragraph 701, equation 703, screen snapshot 705 and table 707.

FIGS. 8, 9 and 10 list one embodiment of a set of report components that can be used to define a wide variety of report templates 114 for generating corresponding reports.

Various embodiments have been described of a method and system that provides an object-oriented, component-based report programming language by which a designer can easily customize and assemble a report at various levels of hierarchical abstraction. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an operating environment of a programmable system including at least one programmable processor (computer) coupled to receive data and instructions from, and to transmit data and instructions to, a data storage system, at least one input device, and at least one output device.

Figure 11:
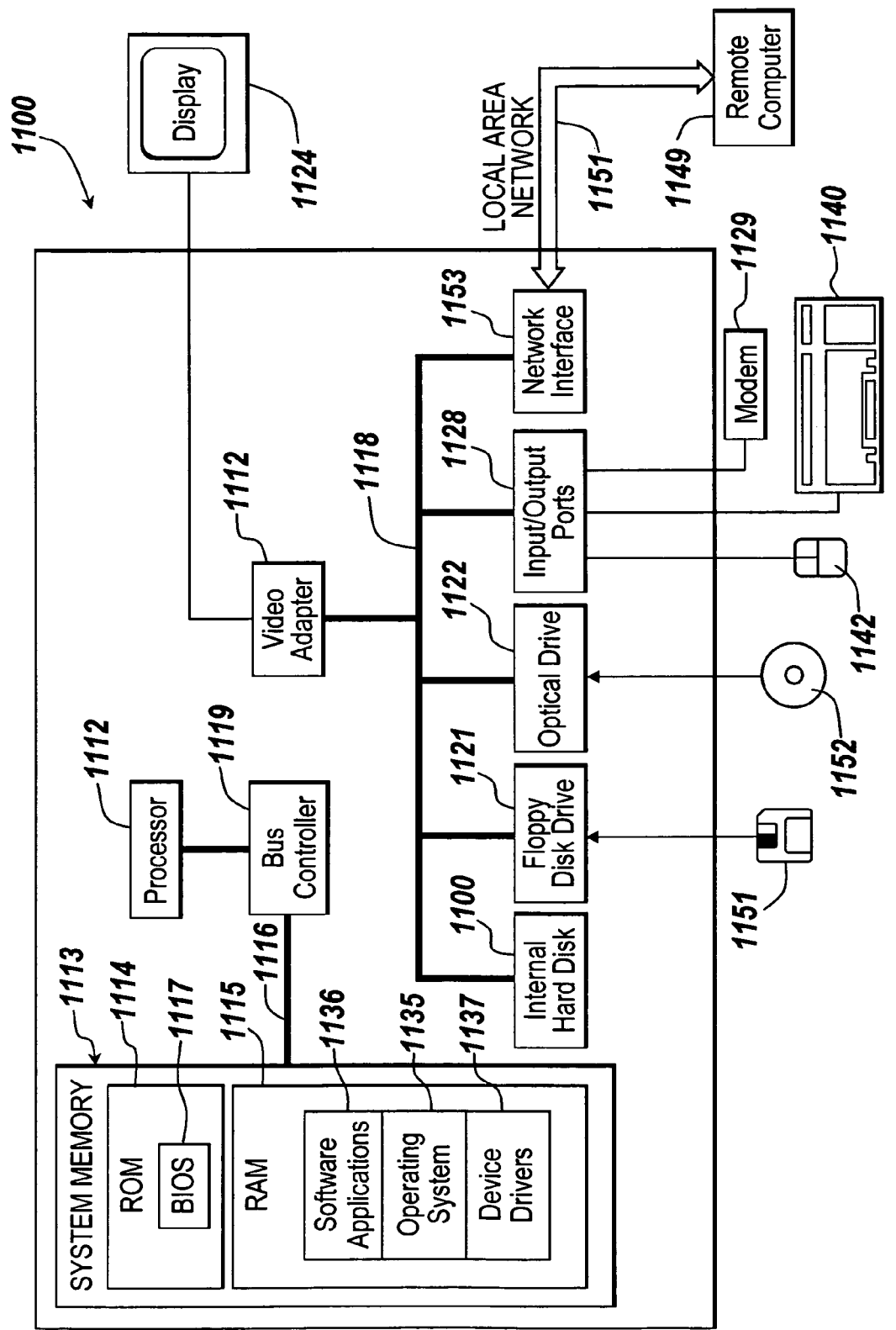
FIG. 11 illustrates on embodiment of a computer suitable for implementing the various embodiments of the invention.

An example of one such type of computer is shown in FIG. 11, which shows a block diagram of a programmable processing system (system) 1100 suitable for implementing or performing the apparatus or methods of the invention. As shown in FIG. 11, the system 1100 includes a processor 1112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. System 1100 represents any server, personal computer, laptop or even a battery-powered, pocket sized, mobile computer known as a hand-held PC or personal digital assistant (PDA).

System 1100 includes system memory 1113 (including read only memory (ROM) 1114 and random access memory (RAM) 1115, which is connected to the processor 1112 by a system data/address bus 1116. ROM 1114 represents any device that is primarily read-only including electrically erasable programmable read-only memory (EEPROM), flash memory, etc. RAM 1115 represents any random access memory such as Synchronous Dynamic Random Access Memory.

Within the system 1100, input/output bus 1118 is connected to the data/address bus 1116 via bus controller 1119. In one embodiment, input/output bus 1118 is implemented as a standard Peripheral Component Interconnect (PCI) bus. The bus controller 1119 examines all signals from the processor 1112 to route the signals to the appropriate bus. Signals between the processor 1112 and the system memory 1113 are merely passed through the bus controller 1119. However, signals from the processor 1112 intended for devices other than system memory 1113 are routed onto the input/output bus 1118.

Various devices are connected to the input/output bus 1118 including hard disk drive 1120, floppy drive 1121 that is used to read floppy disk 1151, and optical drive 1122, such as a CD-ROM drive that is used to read an optical disk 1152. The video display 1124 or other kind of display device is connected to the input/output bus 1118 via a video adapter 1125. Users enter commands and information into the system 1100 by using a keyboard 1140 and/or pointing device, such as a mouse 1142, which are connected to bus 1118 via input/output ports 1128. Other types of pointing devices (not shown in FIG. 11) include track pads, track balls, joysticks, data gloves, head trackers, and other devices suitable for positioning a cursor on the video display 1124.

As shown in FIG. 11, the system 1100 also includes a modem 1129. Although illustrated in FIG. 11 as external to the system 1100, those of ordinary skill in the art will quickly recognize that the modem 1129 may also be internal to the system 1100. The modem 1129 is typically used to communicate over wide area networks (not shown), such as the global Internet. Modem 1129 may be connected to a network using either a wired or wireless connection. System 1100 is coupled to remote computer 1149 via local area network 1150. Software applications 1136 and data are typically stored via one of the memory storage devices, which may include the hard disk 1120, floppy disk 1151, CD-ROM 1152 and are copied to RAM 1115 for execution. In one embodiment, however, software applications 1136 are stored in ROM 1114 and are copied to RAM 1115 for execution or are executed directly from ROM 1114.

In general, the operating system 1135 executes software applications 1136 and carries out instructions issued by the user. For example, when the user wants to load a software application 1136, the operating system 1135 interprets the instruction and causes the processor 1112 to load software application 1136 into RAM 1115 from either the hard disk 1120 or the optical disk 1152. Once one of the software applications 1136 is loaded into the RAM 1115, it can be used by the processor 1112. In case of large software applications 1136, processor 1112 loads various portions of program modules into RAM 1115 as needed.

The Basic Input/Output System (BIOS) 1117 for the system 1100 is stored in ROM 1114 and is loaded into RAM 1115 upon booting. Those skilled in the art will recognize that the BIOS 1117 is a set of basic executable routines that have conventionally helped to transfer information between the computing resources within the system 1100. Operating system 1135 or other software applications 1136 use these low-level service routines. In one embodiment system 1100 includes a registry (not shown) that is a system database that holds configuration information for system 1100. For example, the Windows® operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

What is claimed:

1. A system for creating a report related to a simulator, the system comprising:
    a memory storing a program of instructions;
    a user interface with a display device; and
    a processor that executes the program of instructions and performs a method comprising:
    accessing a report template that defines a set of report components having defined behaviors related to content in the report, the components being arranged in a hierarchy representing the content;
    accessing simulation data generated by the simulator based on the report components defined in the template;
    receiving user inputs through the user interface;
    executing a report generator that generates the report using the simulation data and the defined behaviors and determines the content by adding report components to the set or by removing report components from the set in accordance with the report template and the user inputs; and
    providing the report to the user or to a device with information related to the simulator.

2. A computer-implemented method for creating a report related to a simulator, the method comprising:
    identifying, using a computer, a report template that defines a set comprising one or more report components maintained in a determined arrangement, the components having defined behaviors with respect to the report, the report components being members of the set;
    retrieving simulation data generated by the simulator based on the report components defined in the template;
    generating an intermediate representation of the report, using the computer, using the simulation data and the defined behaviors when the members are executed in a graphical simulation environment; and
    transforming the intermediate representation of the report into a formatted report, using the computer;
    providing the formatted report, using the computer, to a user or a device with information related to the simulator.

3. The method of claim 2, wherein the determined arrangement is a hierarchical tree.

4. The method of claim 3, wherein the behavior of one of the report components is influenced by another report component.

5. The method of claim 4, wherein the another report component is an ancestor component in the hierarchical tree with respect to the one of the report components.

6. The method of claim 4, wherein the another report component is associated with the hierarchical tree.

7. The method of claim 2, wherein a first member controls aspects of the executing with respect to other members, where the other members are related to the first member.

8. The method of claim 7, wherein the other members are child components in the hierarchical tree with respect to the first member.

9. The method of claim 2, further comprising:
implementing the members in an object oriented programming language.

10. The method of claim 9, wherein the implemented members are derived from a common base class.

11. The method of claim 2, further comprising:
interacting with a plurality of style sheets when performing the transforming.

12. The method of claim 11, farther comprising:
performing the transforming in response to an input provided by the user.

13. The method of claim 2, further comprising:
instructing a generation engine to import external information using one or more of the members, the external information related to the report.

14. The method of claim 2, further comprising:
defining a reporting programming language using one or more of the members.

15. The method of claim 14, wherein the reporting programming language comprises flow control constructs.

16. The method of claim 2, further comprising:
defining a new report component or modifying one of the members based on a user input.

17. The method of claim 16, further comprising:
using the new report component or the modified member with the transforming.

18. The method of claim 2, further comprising:
inserting output data into the report using one or more of the members.

19. The method of claim 18, wherein the output data is predefined or is extracted from a technical computing environment.

20. The method of claim 2, further comprising:
generating an intermediate representation prior to the providing.

21. The method of claim 20, wherein the intermediate representation comprises standard generalized markup language (SGML) or extensible markup language (XML).

22. The method of claim 20, wherein the intermediate representation is used to tag elements of the report.

23. The method of claim 2, wherein the providing further comprises:
providing the formatted report in hypertext markup language (HTML), or a typesetting format.

24. The method of claim 2, further comprising:
requesting data from a calculation workspace, evaluating an expression defined with the calculation workspace, requesting data from the simulator, requesting data from a graphics package, changing the state of a simulation model operating with the simulator, or executing an external process to change a state of the calculation workspace.

25. A computer-implemented method for generating a report related to a simulator, the method comprising:
receiving, using a computer, an input from a user associated with the simulator, the input related to a request to generate the report;
processing, using the computer, a report template using a generation engine, the report template comprising report components related to a format of the generated report or to content in the generated report, the report components having defined behavior with respect to the report;
retrieving simulation data generated by the simulator based on the report components defined in the template; and
generating, using the computer, the report using the simulation data and the defined behavior by executing the report components, the generated report further being provided to the user.

26. The method of claim 25, wherein the receiving further comprises:
receiving the input via a user interface integrated with the simulator to generate reports comprising content related to the simulator.

27. The method of claim 25, wherein the input is related to creation of the report template, modification of the report template, or selection of the report template, the creation, modification, or selection performed on behalf of the user.

28. The method of claim 25, wherein the input is used to add a new report component to the report template, modify one or more report components used by the report template, or delete one or more report components related to the report template.

29. The method of claim 25, further comprising:
processing the input using a component creation wizard to define a new report component for inclusion in the report template.

30. The method of claim 25, further comprising:
retrieving a previously defined report template on behalf of the user based on the input.

31. The method of claim 25, further comprising:
providing the user with a list of report templates that includes the report template in response to the input or an instruction generated by a technical computing environment.

32. The method of claim 25, wherein the report uses a user-selected format related to the generated report.

33. The method of claim 32, further comprising:
processing an intermediate representation related to the generated report using a transformation engine; and
generating the report using an output of the transformation engine.

34. The method of claim 33, wherein the transformation engine operates with one or more style sheets when transforming the intermediate representation.

35. The method of claim 25, wherein the generation engine provides a graphical simulation environment in which the report components are executed during the generating.

36. The method of claim 25, further comprising:
displaying a hierarchical tree to the user, the hierarchical tree comprising report components related to the generated report.

37. The method of claim 36, further comprising:
receiving the input in response to the displaying.

38. The method of claim 36, wherein the hierarchical tree comprises child components that are executed in an order determined by a parent component.

39. The method of claim 25, wherein the input is used to select a component to simulate a model using the simulator, increment the simulated model by one or more time steps, change a parameter of the simulated model, change an initial condition of the simulated model, add a functional block to the simulated model, or exchange a state of a calculation workspace that operates with the simulated model.

40. The method of claim 25, wherein the input is received in response to a list of report templates displayed to the user.

41. The method of claim 25, wherein the input is received via a command line interface.

42. A system for creating a report related to a simulator, the system comprising:
a memory storing a program of instructions;
a user interface with a display device; and a processor that executes the program of instructions and performs a method comprising:

displaying a report template in a graphical editor listing report components according to a hierarchy, the components having defined behaviors with respect to the report;

accessing simulation data generated by the simulator based on the report components listed in the template;

displaying report related information in a first portion of the graphical editor, the report related information including a listing of report components used to generate the report;

displaying in a second portion in the graphical editor, report options selectable by a user, or a description related to the simulator or the report components;

receiving from the user, user selections of report options and descriptions to be included in the report;

executing a generation engine to generate the report using the simulation data, the defined behaviors of the components and the user selections; and providing the report to the user or to a device with information related to the simulator.

43. The system of claim 42, wherein the graphical editor exchanges user input information with the generation engine to produce the report comprising a plot, text, an image, or a table.

44. A computer-implemented method for generating a report related to a simulator, the method comprising:

identifying, using a computer, a template that defines a set of report components from a plurality of report components related to a model operating on the computer, the components having defined behavior with respect to the report identifying, using a computer, a format for the report based on the defined behavior of the components;

accessing simulation data generated by the simulator based on the report components defined in the template;

generating, using a generation engine, the report according to the identified format using the simulation data and the defined behaviors of the components, the generated report comprising information about the model in a format interpretable by a user; and providing the report to the user or to a device with information related to the simulator.

45. The method of claim 44, wherein the report components comprise formatting components, graphic handling components, logical and flow control components, reporting components, technical computing components, simulator components, or state control components.

46. The method of claim 45, wherein the formatting components are associated with behaviors or outputs related to a cell table, a chapter, a subsection, an image, a link, a list, a paragraph, a title page, or text.

47. The method of claim 45, wherein the graphic handling components are associated with behaviors or outputs related to a figure loop, a figure property table, a graphics figure snapshot, a graphics object name, or a handle graphics parameter.

48. The method of claim 45, wherein the logical and flow control components are associated with behaviors or outputs related to an if else statement, an if elseif statement, an if then statement, a logical if statement, or a for loop statement.

49. The method of claim 45, wherein the technical computing components are associated with behaviors or outputs related to an evaluation of an expression, an insert variable instruction, a MATLAB version number, a toolbox version number, or a variable table.

50. The method of claim 45, wherein the reporting components are associated with behaviors or outputs related to a comment, an empty comment, an import file, a nest setup file, a stop report, a generation instruction, a time stamp, or a date stamp.

51. The method of claim 45, wherein the simulator components are associated with behaviors or outputs related to a block execution order, a block loop, a block property table, a block type count, a model change log, a model function, a model loop, a model property table, a model simulation, a model variable, an object linking anchor, an object name, an object property, an object summary table, a scope snapshot, a signal loop, a signal property table, a system filter, a system hierarchy, a system loop, a system property table, or a system snapshot.

52. The method of claim 45, wherein the state control components are associated with behaviors or outputs related to a Stateflow loop, a Stateflow object report, a Stateflow property, a table, a Stateflow snapshot, or a stop report generation instruction.

53. An apparatus for creating a report related to a simulator, the apparatus comprising:

means for identifying a report template that defines a set of report components for generating the report, the components having defined behaviors with respect to the report;

means for determining a format for generating the report, based on the defined behaviors;

means for accessing simulation data generated by the simulator based on the report components defined in the template;

means for processing the set and generating the report according to the determined format using the simulation data and the defined behaviors of the report components; and means for providing the report to a user or to a device with information related to the simulator.

54. The apparatus of claim 53, further comprising:

means for receiving a user input, the user input determining at least a portion of the format.

55. The apparatus of claim 53, further comprising:

means for outputting the report to the user.

56. The apparatus of claim 53, wherein the report components comprise:

means for determining the behaviors.

57. A system for creating a report related to a simulator, the system comprising:

a memory storing a program of instructions;

a user interface with a display device; and a processor that executes the program of instructions and performs a method comprising:

accessing a template identifying a set of report components associated with a simulator, the report components having defined behaviors allowing respective report components to act independently while having their respective behaviors influenced by other report components in the set;

accessing simulation data generated by the simulator based on the report components identified in the template;

generating the report according to a determined format using the simulation data and the defined behaviors by processing the set of report components using a generation engine, the report comprising information in a format interpretable by a user; and providing the report to the user or to a device with information related to the simulator.

58. The system of claim 57, wherein the generation engine creates a graphical simulation environment in which the report components run when processed.

59. The system of claim 57, wherein the processor is further configured to:
provide a second template identifying one or more report components from the plurality of the report components, and
wherein the generation engine processes the one or more report components when generating the report or when generating another report.

60. The system of claim 57, wherein the generation engine imports external information when processing the set.

61. The system of claim 57, wherein the generation engine interacts with a technical computing environment during the accessing simulation data, the technical computing environment related to the simulator.

62. The system of claim 57, wherein the generation engine accesses an external code file when generating the report.

63. The system of claim 57, wherein the template is recursively defined.

64. The system of claim 57, wherein the template maintains the set in a hierarchy.

65. The system of claim 57, wherein the report components in the template are determined by the user.

66. The system of claim 57, wherein the report components are implemented in an object oriented programming language.

67. The system of claim 57, wherein the generation engine produces an intermediate representation during the generating, and
wherein a transformation engine operates on the intermediate representation to produce the report.

68. A computer-implemented method for generating a report related to a simulator, the method comprising:
making, using a computer, a template available to a generation engine, the template being associated with a set of a plurality of report components, the components having defined behaviors with respect to the report;
extracting, using the computer, simulation data from a model using at least one of the plurality of report components;
generating, using the computer, the report on behalf of a user or a requesting device using the generation engine, the extracted simulation data, the template and the defined behaviors of the components; and
making, using the computer, the extracted simulation data available to the user or the requesting device in one or more determined formats using the generated report.

69. The method of claim 68, further comprising:
using a first style sheet with at least one of the plurality of report components or the generation engine to generate the report according to a first file format, the first file format being one of the one or more determined formats; and
using a second style sheet with the at least one of the plurality of report components or the generation engine to generate the report according to a second file format.

70. The method of claim 69, further comprising:
interacting with the first style sheet and the second style sheet using a transformation engine; and
processing an intermediate format received from the generation engine using the transformation engine to generate the report in the first file format and the second file format.

71. The method of claim 69, further comprising:
displaying the first file format or the second file format via a local display on a local computer, via a display on a remote computer operating on a network, or via a printer output.

72. The method of claim 69, wherein the first style sheet formats the extracted simulation data according to a first style.

73. The method of claim 69, further comprising:
formatting the extracted simulation data according to a first style using the first style sheet; and
formatting the extracted simulation data according to a second style using the second style sheet.

74. The method of claim 73, wherein the extracted simulation data identifies a data format.

75. A computer readable medium containing instructions which when executed by a processor generate a report related to a simulator, the computer readable medium comprising one or more instructions for:
identifying, using a computer, a report template that defines a set comprising one or more report components maintained in a determined arrangement, the components having defined behaviors with respect to the report, the report components being members of the set;
retrieving simulation data generated by the simulator based on the report components defined in the template;
generating an intermediate representation of the report, using the computer, using the simulation data and the defined behaviors when the members are executed in the graphical simulation environment; and
transforming the intermediate representation of the report into a formatted report, using the computer;
providing the formatted report, using the computer, to a user or a device with information related to the simulator.

76. A computer readable medium containing instructions which when executed by a processor generate a report related to a simulator, the computer readable medium comprising one or more instructions for:
receiving an input from a user associated with the simulator, the input related to a request to generate the report;
processing a report template using a generation engine, the report template comprising report components related to a format of the generated report or to content in the generated report, the report components having defined behavior with respect to the report;
retrieving simulation data generated by the simulator based on the report components defined in the template; and
generating the report using the simulation data and the defined behavior by executing the report components, the generated report further being provided to the user.

77. A computer readable medium containing instructions which when executed by a processor generate a report related to a simulator, the computer readable medium comprising one or more instructions for:
displaying a report template in a graphical editor listing report components according to a hierarchy, the components having defined behaviors with respect to the report;
accessing simulation data generated by the simulator based on the report components listed in the template;
displaying report related information in a first portion of the graphical editor, the report related information including a listing of report components used to generate the report;

displaying in a second portion in the graphical editor, report options selectable by a user, or a description related to the simulator or the report components;

receiving from the user, user selections of report options and descriptions to be included in the report;

executing a generation engine to generate the report using the simulation data, the defined behaviors of the components and the user selections; and providing the report to the user or to a device with information related to the simulator.

78. A computer readable medium containing instructions which when executed by a processor generate a report related to a simulator, the computer readable medium comprising one or more instructions for:

identifying a template that defines a set of report components from a plurality of report components related to a model operating on the computer, the components having defined behavior with respect to the report identifying a format for the report based on the defined behavior of the components;

accessing simulation data generated by the simulator based on the report components defined in the template;

generating the report according to the identified format using the simulation data and the defined behaviors of the components, the generated report comprising information about the model in a format interpretable by a user; and providing the report to the user or to a device with information related to the simulator.

79. A computer readable medium containing instructions which when executed by a processor generate a report related to a simulator, the computer readable medium comprising one or more instructions for:

identifying a report template that defines a set of report components for generating the report, the components having defined behaviors with respect to the report;

determining a format for generating the report based on the defined behaviors;

accessing simulation data generated by the simulator based on the report components defined in the template;

processing the set and generating the report according to the determined format using the simulation data and the defined behaviors of the report components; and providing the report to a user or to a device with information related to the simulator.

80. A computer readable medium containing instructions which when executed by a processor generate a report related to a simulator, the computer readable medium comprising one or more instructions for:

accessing a template identifying a set of report components associated with the simulator, the report components having defined behaviors allowing respective report components to act independently while having their respective behaviors influenced by other report components in the set;

accessing simulation data generated by the simulator based on the report components identified in the template;

generating the report according to a determined format using the simulation data and the defined behaviors by processing the set of report components using a generation engine, the report comprising information in a format interpretable by a user; and providing the report to the user or to a device with information related to the simulator.

81. A computer readable medium containing instructions which when executed by a processor generate a report related to a simulator, the computer readable medium comprising one or more instructions for:

making a template available to a generation engine, the template being associated with a set of a plurality of report components, the components having defined behaviors with respect to the report;

extracting simulation data from a model using at least one of the plurality of report components;

generating the report on behalf of a user or a requesting device using the generation engine, the extracted simulation data, the template and the defined behaviors of the components; and making the extracted simulation data available to the user or the requesting device in one or more determined formats using the generated report.

82. A computer readable medium containing instructions which when executed by a processor generate a report related to a simulator, the computer readable medium comprising one or more instructions for:

accessing a report template that defines a set of report components having defined behaviors related to content in the report, the components being arranged in a hierarchy representing the content;

accessing simulation data generated by the simulator based on the report components defined in the template;

receiving user inputs through a user interface;

executing a report generator that generates the report using the simulation data and the defined behaviors and determines the content by adding report components to the set or by removing report components from the set in accordance with the report template and the user inputs; and providing the report to the user or to a device with information related to the simulator.

* * * * *

UNITED STATES PATENT AND TRADEMARK OFFICE
CERTIFICATE OF CORRECTION

PATENT NO. : 7,542,888 B2  Page 1 of 1
APPLICATION NO. : 11/592058
DATED : June 2, 2009
INVENTOR(S) : David Karl Critz et al.

It is certified that error appears in the above-identified patent and that said Letters Patent is hereby corrected as shown below:

Column 3, Line 23, in the printed patent "graphic. display" should be
--graphic display--.

Signed and Sealed this

Twenty-first Day of July, 2009

JOHN DOLL
*Acting Director of the United States Patent and Trademark Office*